United States Patent
Williams

(10) Patent No.: US 7,920,959 B1
(45) Date of Patent: Apr. 5, 2011

(54) METHOD AND APPARATUS FOR ESTIMATING THE VELOCITY VECTOR OF MULTIPLE VEHICLES ON NON-LEVEL AND CURVED ROADS USING A SINGLE CAMERA

(76) Inventor: Christopher Reed Williams, Denver, CO (US)

( * ) Notice: Subject to any disclaimer, the term of this patent is extended or adjusted under 35 U.S.C. 154(b) by 671 days.

(21) Appl. No.: 11/414,602

(22) Filed: Apr. 28, 2006

Related U.S. Application Data

(60) Provisional application No. 60/676,676, filed on May 1, 2005.

(51) Int. Cl.
G08G 1/00 (2006.01)
G06T 15/00 (2006.01)
G06K 9/20 (2006.01)

(52) U.S. Cl. .......... 701/117; 701/1; 701/28; 701/33; 702/141; 702/142; 702/150; 702/152; 702/153; 345/419; 345/611; 345/612; 345/613; 345/614; 348/135; 348/136; 348/137; 348/148; 348/149; 382/194; 382/195; 382/276; 382/285; 382/286

(58) Field of Classification Search .......... 701/1, 28, 701/33, 117; 702/141, 142, 150, 152, 153; 345/419, 611–615; 348/135–139, 145, 148, 348/149; 382/190–195, 276–286
See application file for complete search history.

(56) References Cited

U.S. PATENT DOCUMENTS

| | | | |
|---|---|---|---|
| 4,214,265 A | 7/1980 | Olesen | 358/93 |
| 4,433,325 A | 2/1984 | Tanaka et al. | 340/937 |
| 4,839,648 A | 6/1989 | Beucher et al. | 340/933 |
| 5,243,663 A | 9/1993 | Kudoh | 382/1 |
| 5,296,852 A | 3/1994 | Rahi | 340/933 |
| 5,301,239 A | 4/1994 | Toyama et al. | 382/1 |
| 5,353,021 A | 10/1994 | Toyama | 340/937 |
| 5,404,306 A | 4/1995 | Mathur et al. | 364/436 |
| 5,434,927 A | 7/1995 | Brady et al. | 382/104 |
| 5,444,442 A | 8/1995 | Sadakata et al. | 340/916 |
| 5,509,082 A * | 4/1996 | Toyama et al. | 382/104 |
| 5,590,217 A | 12/1996 | Toyama | 382/104 |
| 5,691,902 A | 11/1997 | Taniguchi et al. | 364/438 |

(Continued)

OTHER PUBLICATIONS

Charkari, N. Moghadam, and Hideo Mori, 1993: A New Approach for Real Time Moving Vehicle Detection. Proceedings of the 1993 IEEE/RSJ International Conference on Intelligent Robots and Systems, Yokohama, Japan, Jul. 26-30, 1993, pp. 273-278.

(Continued)

*Primary Examiner* — Jack Keith
*Assistant Examiner* — Chuong P Nguyen
(74) *Attorney, Agent, or Firm* — Robert Platt Bell

(57) ABSTRACT

A method and an apparatus is provided for determining the velocity vector, speed, and direction of moving vehicles traveling on roadways which change elevation and have curves. A camera mounted above a roadway observes at least one vehicles traveling in different directions on different roads. Each pixel in the two-dimensional optical image is mapped into a three-dimensional real world location to enable the moving vehicles to be analyzed in the three-dimensional real world as they travel on roads, which may change elevation and may have curves. The estimated vehicle velocities may be displayed on an image near the moving vehicle. Individual images with vehicle velocities may be posted on an Internet site. The sequence of optical images, or streaming video, with the displayed vehicle velocities may also be used for television news programs that show traffic moving on the roadways.

9 Claims, 11 Drawing Sheets

U.S. PATENT DOCUMENTS

| | | | | |
|---|---|---|---|---|
| 5,734,337 | A | 3/1998 | Kupersmit | 340/937 |
| 5,742,699 | A | 4/1998 | Adkins et al. | 382/107 |
| 5,757,287 | A | 5/1998 | Kitamura et al. | 340/937 |
| 5,761,326 | A | 6/1998 | Brady et al. | 382/103 |
| 5,771,485 | A | 6/1998 | Echigo | 701/119 |
| 5,809,161 | A | 9/1998 | Auty et al. | 382/104 |
| 5,847,755 | A | 12/1998 | Wixson et al. | 348/149 |
| 5,912,634 | A | 6/1999 | Bunnen et al. | 340/937 |
| 5,995,900 | A | 11/1999 | Hsiao et al. | 701/117 |
| 5,999,877 | A * | 12/1999 | Takahashi et al. | 701/117 |
| 6,067,367 | A | 5/2000 | Nakajima et al. | 382/103 |
| 6,075,874 | A | 6/2000 | Higashikubo et al. | 382/104 |
| 6,141,435 | A * | 10/2000 | Naoi et al. | 382/104 |
| 6,188,778 | B1 * | 2/2001 | Higashikubo et al. | 382/104 |
| 6,263,088 | B1 | 7/2001 | Crabtree et al. | 382/103 |
| 6,343,100 | B1 * | 1/2002 | Fujiwara et al. | 375/240.17 |
| 6,345,106 | B1 | 2/2002 | Borer | 382/107 |
| 6,377,191 | B1 * | 4/2002 | Takubo | 340/937 |
| 6,411,328 | B1 | 6/2002 | Franke et al. | 348/149 |
| 6,430,303 | B1 * | 8/2002 | Naoi et al. | 382/104 |
| 6,442,474 | B1 | 8/2002 | Trajkovic et al. | 701/117 |
| 6,466,260 | B1 | 10/2002 | Hatae et al. | 348/149 |
| 6,546,119 | B2 | 4/2003 | Ciolli et al. | 382/104 |
| 6,573,929 | B1 | 6/2003 | Glier et al. | 348/149 |
| 6,628,804 | B1 | 9/2003 | Edanami | 382/107 |
| 6,647,361 | B1 | 11/2003 | Laird et al. | 703/8 |
| 6,690,294 | B1 | 2/2004 | Zierden | 340/937 |
| 6,760,061 | B1 | 7/2004 | Glier et al. | 348/149 |
| 6,810,132 | B1 | 10/2004 | Umezaki et al. | 382/104 |
| 6,842,531 | B2 | 1/2005 | Ohtsuka et al. | 382/104 |
| 6,894,717 | B2 | 5/2005 | Bakewell | 348/149 |
| 6,954,226 | B2 | 10/2005 | Hsieh et al. | 348/208.1 |
| 6,954,544 | B2 | 10/2005 | Jepson et al. | 382/107 |
| 6,956,960 | B2 | 10/2005 | Kondo et al. | 382/107 |
| 6,963,658 | B2 * | 11/2005 | Hagihara et al. | 382/107 |
| 6,968,074 | B1 | 11/2005 | Kondo et al. | 382/107 |
| 6,970,102 | B2 | 11/2005 | Ciolli | 340/933 |
| 6,975,749 | B2 | 12/2005 | Chujoh et al. | 382/104 |
| 6,999,004 | B2 | 2/2006 | Comaniciu et al. | 340/937 |
| 7,307,655 | B1 * | 12/2007 | Okamoto et al. | 348/222.1 |
| 2003/0219146 | A1 * | 11/2003 | Jepson et al. | 382/103 |

OTHER PUBLICATIONS

Rojas, J.C., and J.D. Crisman, 1997: Vehicle Detection in Color Images. IEEE Conference on Intelligent Transportation Systems, Nov. 9-12, 1997, pp. 403-408.

Dailey, Daniel J., F.W. Cathey, and Suree Pumrin, 2000: An Algorithm to Estimate Mean Traffic Speed using Uncalibrated Cameras. IEEE Transactions on Intelligent Transportation systems, vol. 1, No. 2, p. 98-107.

Pumrin, S. and D.J. Dailey, 2002: Roadside Camera Motion Detection for Automated Speed Measurement. IEEE Fifth International Conference on Intelligent Transportation Systems, Sep. 3-6, 2002, Singapore, pp. 147-151.

Elgammal, A., R. Duraiswami, D. Harwood, and L.S. Davis, 2002: Background and Foreground Modeling Using Nonparametric Kernel Density Estimation for Visual Surveillance. Proceedings of the IEEE, vol. 90, No. 7, Jul. 2002.

Matsuyama, T., and N. Ukita, 2002: Real-Time Multitarget Tracking by a Cooperative Distributed Vision System. Proceedings of the IEEE, vol. 90, No. 7, Jul. 2002.

Fermuller, C., P. Baker and Y. Aloimonos, 2002: Visual Space-Time Geometry- A Tool for Perception and the Imagination. Proceedings of the IEEE, vol. 90, No. 7, Jul. 2002.

Kim, ZuWham, and Jitendra Malik, 2003: High-Quality Vehicle Trajectory Generation From Video Data Based on Vehicle Detection and Description. Proceedings of the IEEE 2003 Intelligent Transportation Systems. vol. 1, pp. 176-182.

Zhang, C., S.-C. Chen, M.-L. Shyu, and S. Peeta, 2003: Adaptive Background Learning for Vehicle Detection and Spatio-Temporal Tracking. IEEE International Conference on Information, Communications and Signal Processing, Dec. 15-18, 2003, Singapore.

Kate, T.K ten, M.B. van Leewen, S.E. Moro-Ellenberger, B.J.F. Driessen, A.H.G. Versluis, and F.C.A. Groen, 2004: Mid-Range and Distant Vehicle Detection With a Mobile Camera. 2004 IEEE Intelligent Vehicles Symposium, University of Parma, Parma, Italy, Jun. 14-17, 2004, pp. 72-77.

Demonceaux, Cedric, Alexis Potelle, and Djemaa Kach-Akkouche, 2004: Obstacle Detection in a Road Scene Based on Motion Analysis. IEEE Trans. on Vehicular Technology. vol. 53, No. 6, 1649-1656.

Feghali, R. and A. Mitiche, 2004: Spatiotemporal Motion Boundary Detection and Motion Boundary Velocity Estimation for Tracking Moving Objects With a Moving Camera: A Level Sets PDEs Approach With Concurrent Camera Motion Compensation. IEEE Transactions on Image Processing, vol. 13, No. 11, Nov. 2004.

Patras, I., M. Worring, and R. van den Boomgaard, 2004: Dense Motion Estimation Using Regularization Constraints on Local Parametric Models. IEEE Transactions on Image Processing, vol. 13, No. 11, Nov. 2004.

Broggi, A., P. Cerri, and P.C. Antonello, 2004: Multi-Resolution Vehicle Detection Using Artificial Vision. IEEE Intelligent Vehicle Symposium, University of Parma, Parma, Italy, Jun. 14-17, 2004.

Zhou, S. K., R. Chellappa, and B. Moghaddam, 2004: Visual Tracking and Recognition Using Appearance-Adaptive Models in Particle Filters. IEEE Transactions on Image Processing, vol. 13, No. 11, Nov. 2004.

Qian, Gang, Rama Challappa, and Qinfen Zheng, 2005: Bayesian Algorithms for Simultaneous Structure from Motion Estimation of Multiple Independently Moving Objects. IEEE Trans. on Image Processing, v14, n1, 94-109.

He, Z., 2005: Dynamic Programming Framework for Automatic Video Object Segmentation and Vision-Assisted Video Pre-Processing. IEE Proc.-Vis. Image Signal Process. vol. 152, No. 5, Oct. 2005.

Scotti, G., L. Marcenaro, C. Coelho, F. Selvaggi, and C.S. Regazzoni, 2005: Dual Camera Intelligent Sensor for High Definition 360 Degrees Surveillance. IEE Proc.-Vis. Image Signal Process. vol. 152, No. 2, Apr. 2005.

Hillman, P., J. Hannah, and D. Renshaw, 2005: Semi-Automatic Foreground/Background Segmentation of Motion Picture Images and Image Sequences. IEE Proc.-Vis. Image Signal Process. vol. 152, No. 4, Aug. 2005.

Xu, M., J. Orwell, L. Lowey, and D. Thirde, 2005: Architecture and Algorithms for Tracking Football Players with Multiple Cameras. IEE Proc.-Vis. Image Signal Process. vol. 152, No. 2, Apr. 2005.

Cardoso, J.S., and L. Corte-Real, 2005: Toward a Generic Evaluation of Image Segmentation. IEEE Transactions on Image Processing, vol. 14, No. 11, Nov. 2005.

Farmer, M. E., and A.K. Jain, 2005: A Wrapper-base Approach to Image Segmentation and Classification. IEEE Transactions on Image Processing, vol. 14, No. 12, Dec. 2005.

* cited by examiner

METHOD AND APPARATUS FOR ESTIMATING THE VELOCITY VECTOR OF MULTIPLE VEHICLES ON NON-LEVEL AND CURVED ROADS USING A SINGLE CAMERA

CROSS-REFERENCE TO RELATED APPLICATIONS

The present application claims priority from Provisional U.S. patent application Ser. No. 60/676,676 filed on May 1, 2005, and incorporated herein by reference.

FIELD OF THE INVENTION

The present invention relates to measuring the position, velocity vector, speed, and direction of moving vehicles. Specifically the present invention analyzes sequences of two-dimensional optical images to detect multiple vehicles on non-level and curved roads and estimates the three-dimensional real-world position, velocity vector, speed, and direction of moving vehicles.

BACKGROUND OF THE INVENTION

Thousands of Americans die and millions of Americans are injured each year in automobile accidents that involve at least one vehicle traveling with excessive speed. There is no doubt that lives would be saved and fewer accidents would occur if Americans drove at or below the speed limit.

Currently, there are three technologies commonly used to measure the speed of vehicles on the road: radar, manual clocking, and inductive loops. The first two methods are used by safety officers in a proactive mode to enforce the speed limit. The third method is used by traffic flow managers to estimate the speed and to count the number of vehicles on roads throughout the day.

A fourth technology used to measure the speed of vehicles on the road involves passive optical imaging systems. This technology uses cameras to observe the roads and using imaging processing techniques to identify the moving vehicles and estimate their velocities. Analysis techniques that use one camera to estimate the vehicle speed may be broken down into four different categories: (a) single camera to measure vehicle motion across the two-dimensional image, (c) single camera to monitor traffic, to detect vehicle presence, and inaccurately estimate vehicle speed, (c) single camera in-line with vehicle motion to estimate vehicle speed, and (d) single camera with geometry to estimate vehicle speed.

Starting with category (a), analysis techniques in this category identify vehicles in the two-dimensional image and measure the motion across the image. In the image-processing field, this motion across the image is called optical motion, and does not have any relation with the three-dimensional real world. For category (b), the primary purpose of the camera is to monitor the traffic and to detect vehicles on the roadway. Analysis techniques in this category do not present any analytical description of how the vehicle velocity is actually estimated. These details are often left for those 'skilled in the field'. In category (c), the analysis techniques actually estimate the vehicle velocity, but the camera needs to be placed in-line with the direction of travel of the vehicle. This is often accomplished by placing the camera above the road and the camera points down toward the road observing the vehicle as it passes underneath.

The last category (d) is the most relevant to the present invention. Analysis techniques in this category place the single camera above and to the side of the road being monitored. These analysis techniques often focus on one region of the road usually in the center of the camera's field of view. The geometry used to estimate the vehicle velocity is often dependent on the camera tilt angle and camera pan angle. Since the analysis technique is focused on one region of the road, these analysis techniques may only process one vehicle at a time. Since the analysis technique is optimized for one region, the road must be level in this region for the velocities to be accurate. Also, the vehicles must be traveling in a straight direction.

SUMMARY OF THE INVENTION

The present invention overcomes some of the limitations of the Prior Art. In particular, the present invention transforms the two-dimensional optical image into the three-dimensional real world and performs all of the distance and velocity calculations in the three-dimensional real-world domain. The present invention also relates each pixel to a three-dimensional real-world location and allows multiple vehicles to be analyzed throughout the whole optical image. The present invention may also estimate the velocities of vehicles traveling on roads that change elevation and on roads that have curves.

Simultaneous estimation of the speed of multiple vehicles traveling on different roads in different directions defines the overriding objective and advantage of the present invention. While the Prior Art analyzed optical images to estimate the speed of a single vehicle traveling in one known direction, the present invention analyzes optical images to simultaneously estimate the speed of multiple vehicles traveling in different directions including traveling uphill, downhill, and around curves.

Additionally, the present invention estimates the vehicle velocity vector, which is composed of the vehicle speed and vehicle direction, in the three-dimensional real world. Estimating the vehicle velocity vector enables the vehicle speed to be estimated over non-straight roads. Thus, contrary to the Prior Art, the present invention estimates the vehicle speed of vehicles traveling on curved roads.

Furthermore, estimating the vehicle velocity vector enables the vehicle speed to be estimated as the vehicle travels on a road that changes elevation. Thus, contrary to the Prior Art, the present invention estimates the vehicle speed of vehicles traveling on roads that change elevation.

Further advantages of the present invention will become apparent from a consideration of the drawings and the ensuing description.

The present invention uses passive remote sensing technology and image processing techniques to identify and quantify the three-dimensional movement of multiple moving vehicles observed by a two-dimensional optical observing system. The present invention uses one camera mounted above a roadway system to observe vehicles traveling on different roads. Using the camera tilt angle, the camera pan angle, and the camera lens zoom characteristics, each pixel in the two-dimensional optical image is assigned a unique pixel tilt angle and pixel pan angle. A survey of the roadway system provides the elevation of the individual roads relative to the camera. Using the pixel tilt angle, the pixel pan angle, and the roadway elevations, each pixel in the two-dimensional optical image is mapped into a unique three-dimensional real-world location on the roadway system.

The moving vehicles are identified in the two-dimensional optical image and a pixel in the two-dimensional optical image is assigned to represent the two-dimensional optical image location of each vehicle. Using the pixel transformation outlined above, each identified vehicle is mapped into a three-dimensional real-world location on the roadway system. The velocities of the vehicles are estimated in the three-dimensional real world and enables moving vehicles to be analyzed as they travel on roads that change elevation and change directions.

The present invention also describes how the estimated vehicle speed is displayed on the optical image. After the vehicle velocity has been estimated by analyzing sequential optical images, the speed may be superimposed over each vehicle in the image indicating the speed of each vehicle. The speed may be the instantaneous or the time-average speed of each vehicle. In another configuration, the speed may be displayed in a stationary position on the optical image near the lane of the road in which the cars are traveling. The displayed speed may be the instantaneous speed of the last vehicle that passed, or may be the time-average of the vehicles traveling in that selected lane.

The present invention also describes how an optical image with the displayed vehicle velocities may be posted on an Internet site and may be viewed by the public. Individual images may be posted onto the Internet site. Also, streaming video, or the sequence of optical images, showing the vehicles moving across the image and their estimated velocities may be posted on the Internet site. The sequence of optical images, or streaming video, with the displayed vehicle velocities may also be used for television news programs that show traffic moving on the roadways.

DETAILED DESCRIPTION OF THE INVENTION

Figure 1:
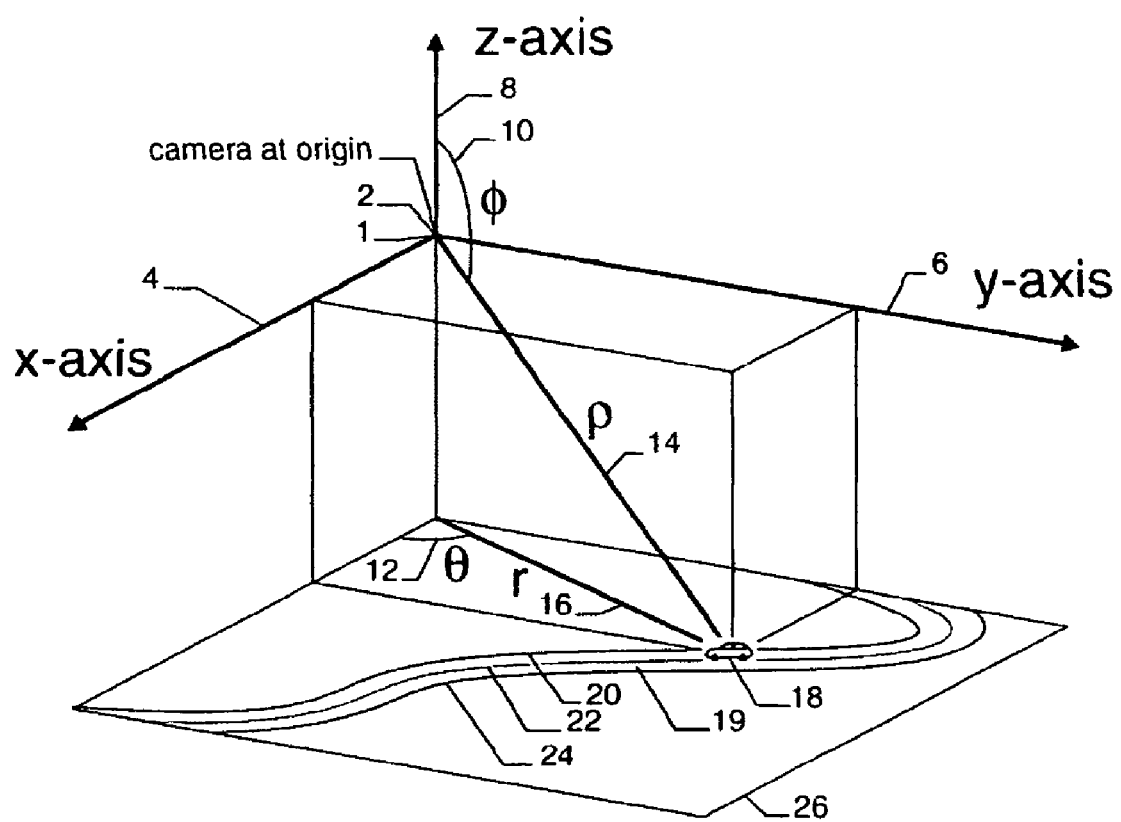
FIG. 1 is a diagram illustrating a three-dimensional real-world layout of the camera observing a road.

The preferred embodiment of the present invention will be explained with reference to FIGS. 1 to 10. Identical parts are denoted by the same reference numerals throughout the views.

A preferred embodiment of the present invention is a three-dimensional vehicle velocity vector analysis system. According to this three-dimensional vehicle velocity vector analysis system, a single camera 2 is mounted above a roadway system and observes the roadway system in camera 2's field of view. The roadway system may comprise individual roads 19 which may head in different directions, have different elevations, have elevations, which change with distance, and have curves, which change the direction of the roads. Vehicles 18 traveling on the individual roads 19 may travel in different directions.

The single camera 2 and a data storage system (not shown) record an image sequence of the vehicles traveling on individual roads 19. Each image of the image sequence is called a frame, the time interval between frames is known, and the frame is a two-dimensional representation of the three-dimensional real world observed by camera 2. Each frame is composed of a two-dimension matrix of pixels. Each pixel is assigned a unique tilt angle and pan angle. Using a survey of the roadway system to provide the altitude of the individual roads relative to camera 2, each pixel in a two-dimensional frame is mapped into a three-dimensional real-world location on the roadway system.

Using image-processing techniques, vehicles 18 moving on the roadways 19 are identified in a two-dimensional optical image. Using the unique mapping technique of the present invention which relates each pixel location in the two-dimensional optical image to a three-dimensional real-world location, identified vehicles 18 are assigned a location in the three-dimensional real world. The velocity vector for each vehicle is calculated by estimating the distance traveled in the three-dimensional real world, and dividing this distance by the time interval between the two position estimates. The velocity vectors may comprise speed and direction needed to describe the vehicle motion in the three-dimensional real world. Having both components enables the present invention to estimate the speed of vehicles 18 traveling on roads 19 which may change altitude relative to camera 2, and also estimate the speed of vehicles 18 traveling on roads 19 which have curves. The present invention also enables the velocity vector of many vehicles to be estimated simultaneously. The velocity estimates may be displayed on an optical image either in fixed locations on the image or super-imposed over the vehicles and move across the image as the vehicle moves across the image.

The present invention estimates the vehicle velocity from a single camera 2 and may be used in several different applications. A preferred application embodiment includes estimating the velocity of multiple vehicles 18 traveling on a roadway system and displaying the estimated velocities on the image near the appropriate vehicle. The sequence of images with the super-imposed velocities form a streaming video that shows the vehicles 18 traveling on the roadway 19 with their velocities moving across the screen near the corresponding vehicle. This streaming video would be appropriate for television news programs that show video images of roadway traffic.

Another application embodiment includes estimating the velocity of multiple vehicles 18 traveling on a roadway system and displaying the estimated velocities on the image near the appropriate vehicle 18. A single image with the displayed vehicle velocities provides additional information on the road conditions not available from just an image of the road that contains vehicles. For example, a vehicle traveling at 30 miles per hour when the posted speed limit is 60 miles per hour is an indication that the road is not safe to be traveled at the posted speed limit. A single image with the displayed vehicle velocities may be uploaded to an Internet site that may be viewed by the general public to inform them of the current road conditions and of the speeds vehicles 18 are traveling.

In order to describe the present invention in sufficient detail, the description is divided into four sections. The first section describes the mathematics needed to estimate the vehicle position, velocity vector, speed, and direction in the three-dimensional real world. The second section describes the coordinate transformation from camera 2 derived two-dimensional images to the three-dimensional real world. The third section describes how vehicle 18 may be identified in the two-dimensional optical image. And the fourth section describes the operation of the system from the initial camera set-up to displaying the estimates on the optical images.

A. Mathematics Describing the Three-Dimensional Real-World

FIG. 1 is a diagram illustrating a three-dimensional layout of camera 2 observing the roadway system. Camera 2 is mounted above the roadway system and is pointed downward to observe the roadway system. Camera 2 may be mounted on a dedicated pole or structure. Likewise, camera 2 may be mounted on a bridge crossing or on a building or other structure near the roads being observed. How camera 2 is mounted or to what camera 2 is attached is not critical, but camera 2 must be above the roads and pointed downward to observe the vehicles on the road. The Cartesian coordinate system is defined by the x-axis 4, y-axis 6, and z-axes 8 as illustrated in FIG. 1 with camera 2 located at the origin (x=0, y=0, z=0) position 1. Depending on the attributes of the optical properties of camera 2, the optical observing system observes a defined field of view (FOV). The x, y, and z coordinate system shown in FIG. 1 is one representation of the three-dimensional geometry of the real world. The x-axis 4 and the y-axis 6 define the horizontal plane that passes through camera 2. The z-axis 8 passes through camera 2 and has positive values above camera 2.

The Spherical coordinate system also defines the three-dimensional geometry of the real world using two angles and one distance. Each Cartesian coordinate (x,y,z) may be expressed with Spherical coordinates ($\phi, \theta, \rho$). The Spherical coordinate system has origin 1 centered on camera 2, and tilt angle $\phi$ 10 is defined as the angle from the positive z-axis 8. Pan angle $\theta$ 12 is defined as the angle from positive x-axis 4 towards positive y-axis 6. The distance from the origin 1 is shown by $\rho$ 14 and the horizontal distance from z-axis 8 is shown by r 16. The mapping between the Cartesian and Spherical coordinate systems may be expressed using these geometric relations:

$$\rho^2 = x^2+y^2+z^2 \ r^2 = x^2+y^2 \ r = \rho \sin \phi \ x = r \cos \theta = \rho \sin \phi \cos \theta \ y = r \sin \theta = \rho \sin \phi \sin \theta \ z = \rho \cos \phi \quad (1)$$

These geometric relationships are innovatively used in the present invention to transform the two-dimensional images observed by the imaging system into the location of the vehicle in the three-dimensional real-world space.

In FIG. 1, a vehicle 18 is shown on a road 19 comprising a first road boundary 20 closest to camera 2, the center line 22, and a second boundary 24 farthest from camera 2. In FIG. 1, road 19 is on ground 26 that has a constant altitude relative camera 2 in this example.

Figure 2A:
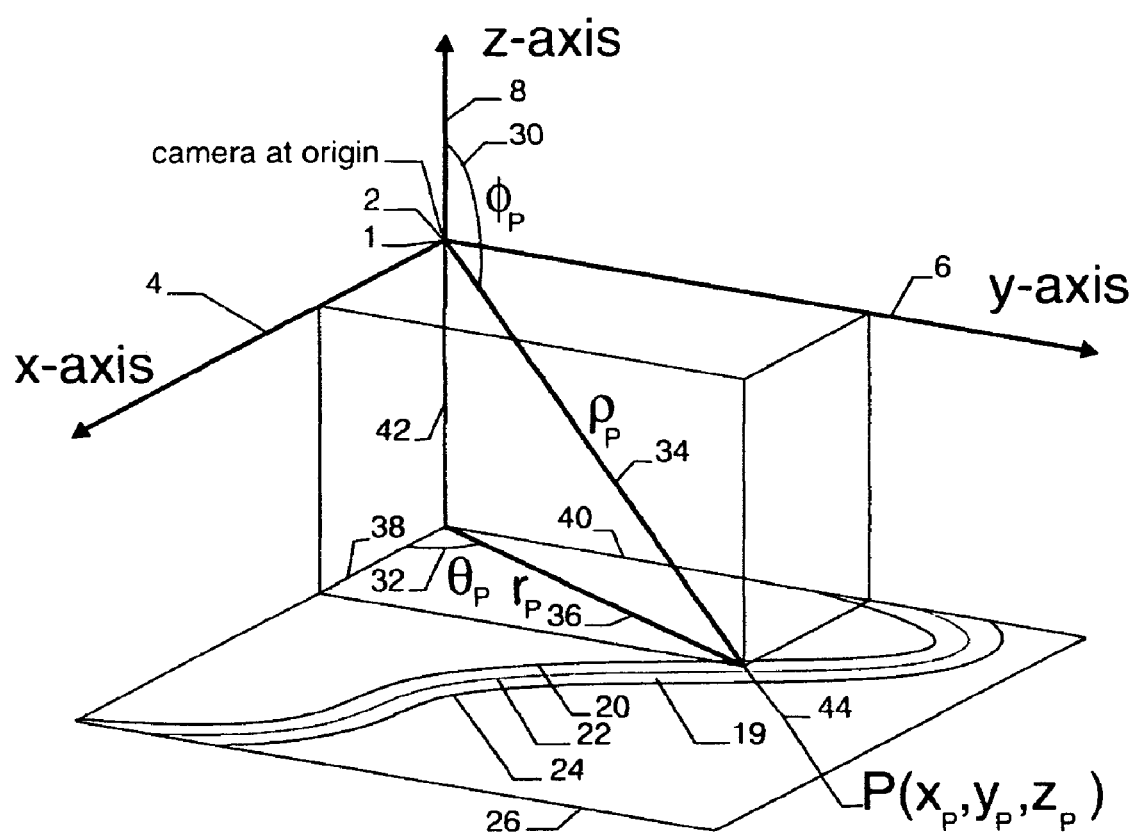
FIG. 2A is a diagram illustrating the Cartesian and Spherical coordinate descriptions of two points representing the location of one vehicle at a first time.

Camera 2 and data storage system (not shown) record an image sequence comprising individual frames. A unique time is associated with each frame. The image processing needed to identify vehicles in the frame is discussed in a later section. For the purposes of estimating the vehicle velocity vector, FIG. 2A illustrates a point $P(x_P, y_P, z_P)$ 44 located on road 19 indicating a location of a vehicle (not shown in FIG. 2A for clarity) at a time $t=t_P$. In the Cartesian coordinate system, point $P(x_P, y_P, z_P)$ 44 has a location defined by the distances from the origin 1 along the x-axis 4 $x_P$ 38, along the y-axis 6 $y_P$ 40, and along the z-axis 8 $z_P$ 42. In Cartesian coordinates, the point $P(x_P, y_P, z_P)$ 44 is located at the position:

$$P(x_P, y_P, z_P) = x_P \hat{x} + y_P \hat{y} + z_P \hat{z} \quad (2)$$

where $\hat{x}$, $\hat{y}$, and $\hat{z}$ represent the unit vectors along the x-axis 4, y-axis 6, and z-axis 8, respectively.

In the Spherical coordinate system, the point $P(x_P, y_P, z_P)$ 44 has the location defined by the tilt angle $\phi_P$ 30, pan angle $\theta_P$ 32, and distance $\rho_P$ 34 from the origin 1. Using the geometry relations written in equation (1), the distances $x_P$ 38, $y_P$ 40, and $z_P$ 42 may be expressed using Spherical coordinates as:

$$P(x_P, y_P, z_P) = \rho_P \sin \phi_P \cos \theta_P \hat{x} + \rho_P \sin \phi_P \sin \theta_P \hat{y} + \rho_P \cos \phi_P \hat{z}. \quad (3)$$

From the geometry shown in FIG. 2A and the relationships written in equation (1), the following expressions may be written as:

$$r_P = \rho_P \sin \phi_P \quad (4)$$

and $$r_P = z_P \tan \phi_P \quad (5)$$

where $r_P$ 36 defines the distance point $P(x_P, y_P, z_P)$ 44 is from origin 1 in the (x, y) plane, and $z_P$ 42 is a distance along z-axis 8 representing elevation distance point $P(x_P, y_P, z_P)$ 44 is from camera 2 located at origin 1 of the coordinate systems. Note that by definition of the Spherical coordinate system, distances above camera 2 along positive z-axis 8 have a positive sign and distances below camera 2 along negative z-axis 8 have a negative sign. Also note that tilt angle 30 is defined relative to positive z-axis 8. This implies that observations of road 19 will have tilt angles 30 greater than 90° but less than 180°. The trigonometric tan function has negative values for this range of tilt angles 30. Thus, the magnitude of $r_P$ 36 expressed in equation (5) will have a positive value.

The relationships shown in equations (4) and (5) may be substituted into equation (3) to yield:

$$P(x_P, y_P, z_P) = z_P \tan \phi_P \cos \theta_P \hat{x} + z_P \tan \phi_P \sin \theta_P \hat{y} + z_P \hat{z}. \quad (6)$$

where equation (6) illustrates that the location of point $P(x_P, y_P, z_P)$ 44 in the three-dimensional real world may be described using tilt angle $\phi_P$ 30, pan angle $\theta_P$ 32, and elevation distance $z_P$ 42 of point $P(x_P, y_P, z_P)$ 44 relative to camera 2 located at origin 1 of the coordinate systems.

Figure 2B:
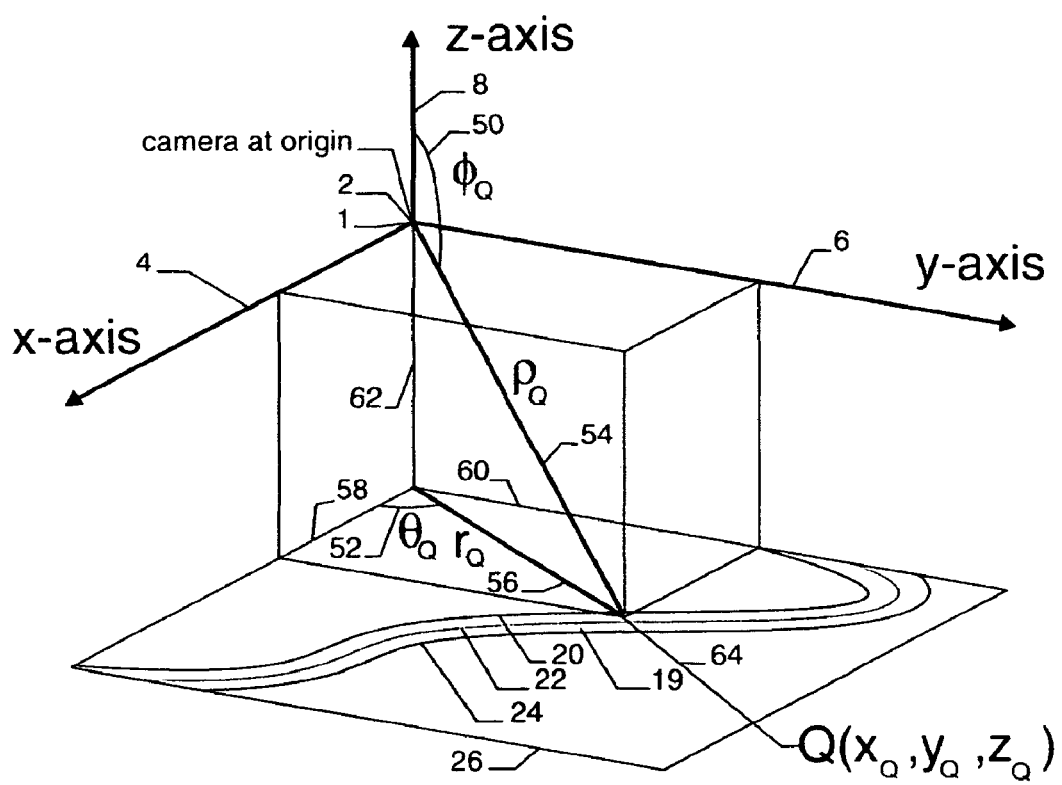
FIG. 2B is a diagram illustrating a Cartesian and Spherical coordinate descriptions of two points representing the location of one vehicle at a second time.

FIG. 2B shows a point $Q(x_Q, y_Q, z_Q)$ 64 located on road 19 indicating a location of the same vehicle referred to in FIG. 2A (also not shown in FIG. 2B for clarity) at time $t=t_Q$.

In the Cartesian coordinate system, point $Q(x_Q, y_Q, z_Q)$ 64 has a location defined by distances from origin 1 along x-axis 4 $x_Q$ 58, along y-axis 6 $y_Q$ 60, and along z-axis 8 $z_Q$ 62. Using the formulation illustrated in equation (6), the location of point $Q(x_Q, y_Q, z_Q)$ 64 may be expressed as:

$$Q(x_Q, y_Q, z_Q) = z_Q \tan \phi_Q \cos \theta_Q \hat{x} + z_Q \tan \phi_Q \sin \theta_Q \hat{y} + z_Q \hat{z} \quad (7)$$

where $\phi_Q$ 50 is the tilt angle relative to positive z-axis 8, and $\theta_Q$ 52 is the pan angle relative to positive x-axis 4. Also defined in FIG. 2B is a total distance $\rho_Q$ 54 from point $Q(x_Q, y_Q, z_Q)$ 64 to origin 1, and a distance $r_Q$ 56 from point $Q(x_Q, y_Q, z_Q)$ 64 to origin 1 in the (x, y) plane.

The distance vector between points P and Q in the three-dimensional real world using Cartesian coordinates is given by:

$$\overline{AD} = Q(x_Q, y_Q, z_Q) - P(x_P, y_P, z_P) = (z_Q \tan \phi_Q \cos \theta_Q - z_P \tan \phi_P \cos \theta_P)\hat{x} + (z_Q \tan \phi_Q \sin \theta_Q - z_P \tan \phi_P \sin \theta_P)\hat{y} + (z_Q - z_P)\hat{z} \quad (8)$$

where the overbar indicates that $\overline{AD}$ is a vector quantity comprising magnitude and direction. Note from equation (8), the three-dimensional distance vector between two points in the three-dimensional real world may be estimated from four angles ($\phi_P$ 30, $\theta_P$ 32, $\phi_Q$ 50, and $\theta_Q$ 52) and two altitudes ($z_P$ 42 and $z_Q$ 62).

Equation (8) defines the distance vector a vehicle has traveled between two instants in time. A velocity vector is defined as the distance vector divided by the time interval needed to travel between the two end points of the distance vector. In the example shown in FIG. 2A and FIG. 2B, the time interval is defined as $\Delta t = t_Q - t_P$ and the velocity vector is given by:

$$\overline{V} = \frac{\overline{AD}}{\Delta t} = \frac{Q(x_Q, y_Q, z_Q) - P(x_P, y_P, z_P)}{t_Q - t_P} = \frac{(z_Q \tan\phi_Q \cos\theta_Q - z_P \tan\phi_P \cos\theta_P)\hat{x} + (z_Q \tan\phi_Q \sin\theta_Q - z_P \tan\phi_P \sin\theta_P)\hat{y} + (z_Q - z_P)\hat{z}}{t_Q - t_P}. \quad (9)$$

The vehicle velocity vector comprises two components, speed and direction of the vehicle. The speed is a distance traveled divided by the time required to travel that distance. The direction is a unit vector pointing in the direction from the starting location to the ending position. The speed of a vehicle must include the distances traveled in all three Cartesian coordinate directions and is given by:

$$S = \frac{|\Delta D|}{\Delta t} = \frac{|\Delta x| + |\Delta y| + |\Delta z|}{\Delta t} \quad (10)$$

where S is the vehicle speed estimate. The direction of the vehicle has a magnitude of unity and is given by:

$$\Lambda = \frac{|\Delta x|^2 \hat{x} + |\Delta y|^2 \hat{y} + |\Delta z|^2 \hat{z}}{|\Delta D|^2} = \frac{\Delta x^2 \hat{x} + \Delta y^2 \hat{y} + \Delta z^2 \hat{z}}{\Delta x^2 + \Delta y^2 + \Delta z^2} \quad (11)$$

where $\Lambda$ is the vehicle direction.

A.1. Vehicle Velocity Vector Estimated on a Road that Changes Elevation

Figure 3:
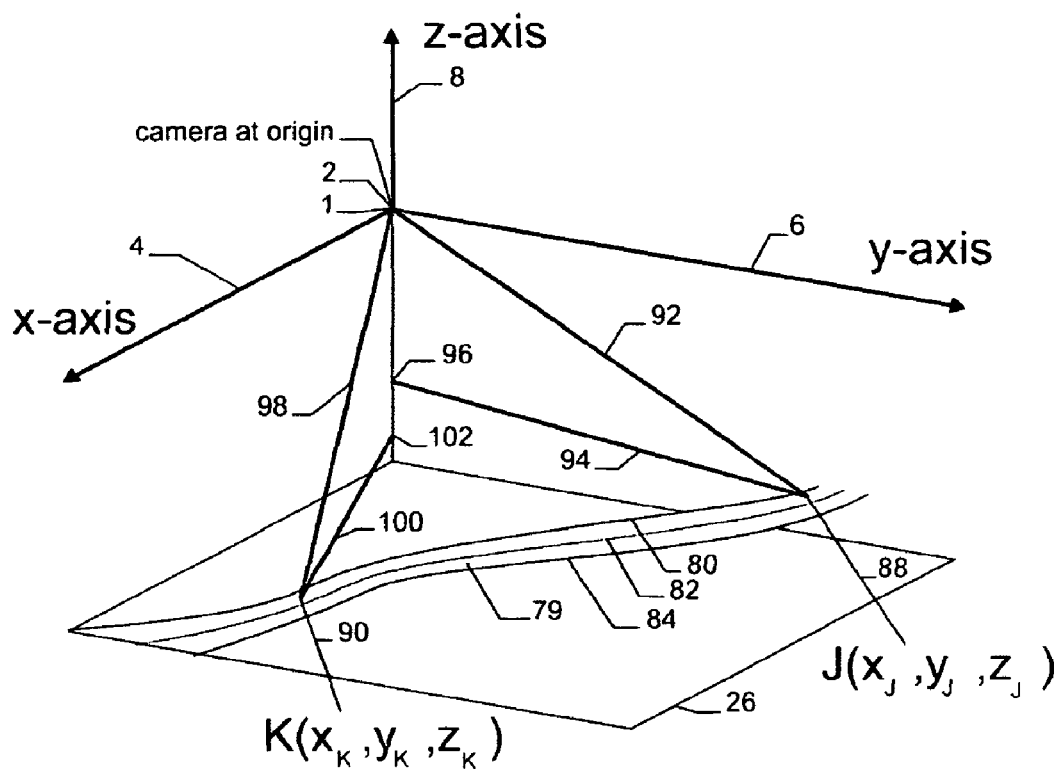
FIG. 3 is a diagram illustrating a Spherical coordinate description of two points on a road that have different elevations.

FIG. 3 illustrates a scenario where a road 79 changes elevation relative to camera 2. Here, the elevation of road 79 between two points 88, 90 on road 79 may not be the same. In this general case, equation (8) describes the three-dimensional distance between the two points 88 and 90. FIG. 3 illustrates points $J(x_J, y_J, z_J)$ 88 and $K(x_K, y_K, z_K)$ 90 on road 79 that changes elevation. In FIG. 3, ground 26 is shown to be at a uniform elevation relative to origin 1 of the coordinate system. Road 79 has a boundary 80 closer to origin 1, a center line 82, and a boundary 84 further away from origin 1. While in practice the points used to estimate the vehicle velocity may be physically closer together on road 79 than illustrated in FIG. 3, the gap between the two points 88, 90 illustrated in FIG. 3 is used to more clearly illustrate the difference in elevation between two points on road 79. Points $J(x_J, y_J, z_J)$ 88 and $K(x_K, y_K, z_K)$ 90 represent the location of one vehicle at two observation times of $t = t_J$ and $t = t_K$. The change in elevation may be seen in FIG. 3 by examining z-axis 8 where horizontal distances 94, 100 intersect z-axis 8. Distance $r_J$ 94 is the horizontal distance from point $J(x_J, y_J, z_J)$ 88 to z-axis 8 and intersects z-axis 8 at $z_J$ 96. Distance $r_K$ 100 is the horizontal distance from point $K(x_K, y_K, z_K)$ 90 to z-axis 8 and intersects z-axis 8 at $z_K$ 102. Distance $\rho_J$ 92 is the distance from point $J(x_J, y_J, z_J)$ 88 to origin 1. Distance $\rho_K$ 98 is the distance from point $K(x_K, y_K, z_K)$ 90 to origin 1.

The locations of $J(x_J, y_J, z_J)$ 88 and $K(x_K, y_K, z_K)$ 90 may be described using tilt angles, pan angles, and elevations to produce equations similar to equation (7):

$$J(x_J, y_J, z_J) = z_J \tan \phi_J \cos \theta_J \hat{x} + z_J \tan \phi_J \sin \theta_J \hat{y} + z_J \hat{z}K$$
$$(x_K, y_K, z_K) = z_K \tan \phi_K \cos \theta_K \hat{x} + z_K \tan \phi_K \sin \theta_K \hat{y} + z_K \hat{z}. \quad (12)$$

One of the innovative features of the present invention is the ability to estimate a distance between two points in the three-dimensional real world when given the two-dimensional images produced by stationary camera 2. In order to determine the three-dimensional real world distance between two points using just the observed tilt and pan angles, the elevation of road 79 for each tilt and pan angle must be pre-determined. The tilt angle, pan angle, and elevation of road 79 relative to camera 2 may be obtained by physically surveying road 79 and measuring physical attributes of road 79 relative to camera 2. The survey information forms a database which relates every tilt and pan angle of camera 2 with a surface elevation. This pre-determined database only changes when camera 2 is moved away from the defined origin (x=0, y=0, z=0) 1 of the Cartesian or Spherical coordinate system. The unique relationship between the tilt and pan angles and surface elevation is described mathematically for points $J(x_J, y_J, z_J)$ 88 and $K(x_K, y_K, z_K)$ 90 shown in FIG. 3 as:

$$z_J = z(\phi_J, \theta_J) \ z_K = z(\phi_K, \theta_K) \quad (13)$$

where $z(\phi_J, \theta_J)$ and $z(\phi_K, \theta_K)$ are the surface elevations stored in the database for the two angle pairs of $(\phi_J, \theta_J)$ and $(\phi_K, \theta_K)$, respectively.

The distance between the two points $J(x_J, y_J, z_J)$ 88 and $K(x_K, y_K, z_K)$ 90 shown in FIG. 3 may be written in a general form by substituting equation (13) into equation (8) to yield:

$$\overline{AD} = K(x_K, y_K, z_K) - J(x_J, y_J, z_J) = (z(\phi_K, \theta_K) \tan \phi_K \cos \theta_K - z(\phi_J, \theta_J) \tan \phi_J \cos \theta_J)\hat{x} + (z(\phi_K, \theta_K) \tan \phi_K \sin \theta_K - z(\phi_J, \theta_J) \tan \phi_J \sin \theta_J)\hat{y} + (z)(\phi_K, \theta_K) - z(\phi_J, \theta_J))\hat{z} \quad (14)$$

Equation (14) illustrates how the three-dimensional distance between two points may be estimated from the tilt and pan angles corresponding to the two points and from the elevation of the two points that are pre-determined and saved in a database as a function of the tilt and pan angles.

A.2. Vehicle Velocity Vector Estimated on a Road with Constant Elevation

FIG. 2A and FIG. 2B illustrate the case when a road 19 has a constant elevation relative to the observing system. The elevation of points $P(x_P, y_P, z_P)$ 44 (shown in FIG. 2A) and $Q(x_Q, y_Q, z_Q)$ 64 (shown in FIG. 2B) relative to camera 2 located at the origin 1 is the same. In this case, the elevations $z_P$ and $z_Q$ may be simplified with the expression:

$$z_P = z_Q = z_{road}. \quad (15)$$

The distance between points $P(x_P, y_P, z_P)$ 44 and $Q(x_Q, y_Q, z_Q)$ 64 in the three-dimensional real world may be expressed by substituting equation (15) into equation (8) yielding:

$$\overline{AD} = Q(x_Q, y_Q, z_Q) - P(x_P, y_P, z_P) = (z_{road} \tan \phi_Q \cos \theta_Q - z_{road} \tan \phi_P \cos \theta_P)\hat{x} + (z_{road} \tan \phi_Q \sin \theta_Q - z_{road} \tan \phi_P \sin \theta_P)\hat{y} + (z_{road} - z_{road})\hat{z} \quad (16)$$

Noting that there is no change in distance in the $\hat{z}$ dimension, equation (16) may be written as:

$$\hat{AD} = Q(z_Q, y_Q, z_Q) - P(z_P, y_P, z_P) = z_{road}(\tan \phi_Q \cos \theta_Q - \tan \phi_P \cos \theta_P)\hat{x} + z_{road}(\tan \phi_Q \sin \theta_Q - \tan \phi_P \sin \theta_P)\hat{y} \quad (17)$$

The significance and innovation of equation (17) is that when road 19 follows a constant elevation relative to camera 2 the distance between two points in the three-dimensional real world may be estimated from the two observed tilt angles, the two observed pan angles and a constant elevation. Note that the constant elevation is pre-determined by measuring the elevation of road 19 relative to camera 2 located at origin 1 of the coordinate system.

A.3. Vehicle Velocity Vector Estimated on a Curved Road

In previous sections, it was shown how the location of any point in the three-dimensional real world may be described by the tilt angle, pan angle, and the elevation of the point relative to camera 2 located at the origin of the coordinate system. This section describes how the distance, the velocity vector, the speed, and the direction of a moving vehicle that is not moving in a straight path may be estimated from a sequence of point observations.

Figure 4:
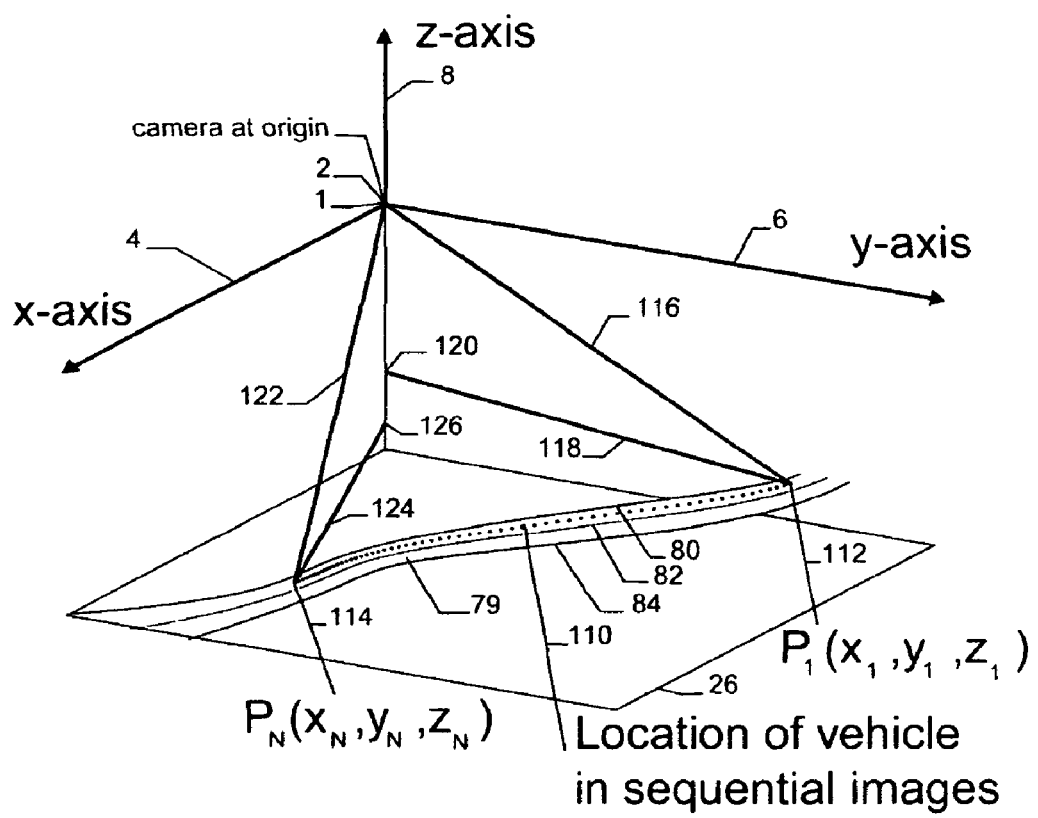
FIG. 4 is a diagram illustrating a Spherical coordinate description of two points on a road that have different elevations and the location of a vehicle on the road determined after analyzing sequential images.

FIG. 4 shows camera 2 located at the origin 1 of a coordinate system with road 79 within the field of view. The elevation of road 79 changes relative to camera 2. Point $P(x_1, y_1, z_1)$ 112 illustrated in FIG. 4 is the location of a vehicle observed by camera 2 at time $t=t_1$. Camera 2 records a sequence of images and the vehicle is identified and located in each of the image frames. During the sequence of images, the vehicle moves down the road 79 and the locations of the vehicle estimated from each frame are shown in FIG. 4 as dots 110 on the road 79. The location of the vehicle at time $t=t_N$ is shown in FIG. 4 as point $P(x_N, y_N, z_N)$ 114. The location of the vehicle between points $P_1$ and $P_N$ on the road 79 were collected in sequential order, have associated times between time $t=t_1$ and $t=t_N$, and are shown on the road 79 as individual points 110.

Given the sequence of points $P(x_1, y_1, z_1)$ 112 through $P(x_N, y_N, z_N)$ 114, the distances, velocity vector, speed and direction may be estimated between any two points located on road 79. These estimates are made using distances calculated in the three-dimensional real world. As long as the time increments are small and the distance between points is small, these three-dimensional real world estimates may be viewed as straight-line approximations of the vehicle's movement. The vehicle velocity, speed, and direction are estimated from straight-line segments even though the vehicle travels over a curved path as it passes through the field of view.

B. Transformation Between the Optical Image and the Real-World

This section describes how the two-dimensional images observed by the optical observing system may be transformed to represent the three-dimensional real world.

B.1. Defining the Observing System Coordinate System

Figure 5:
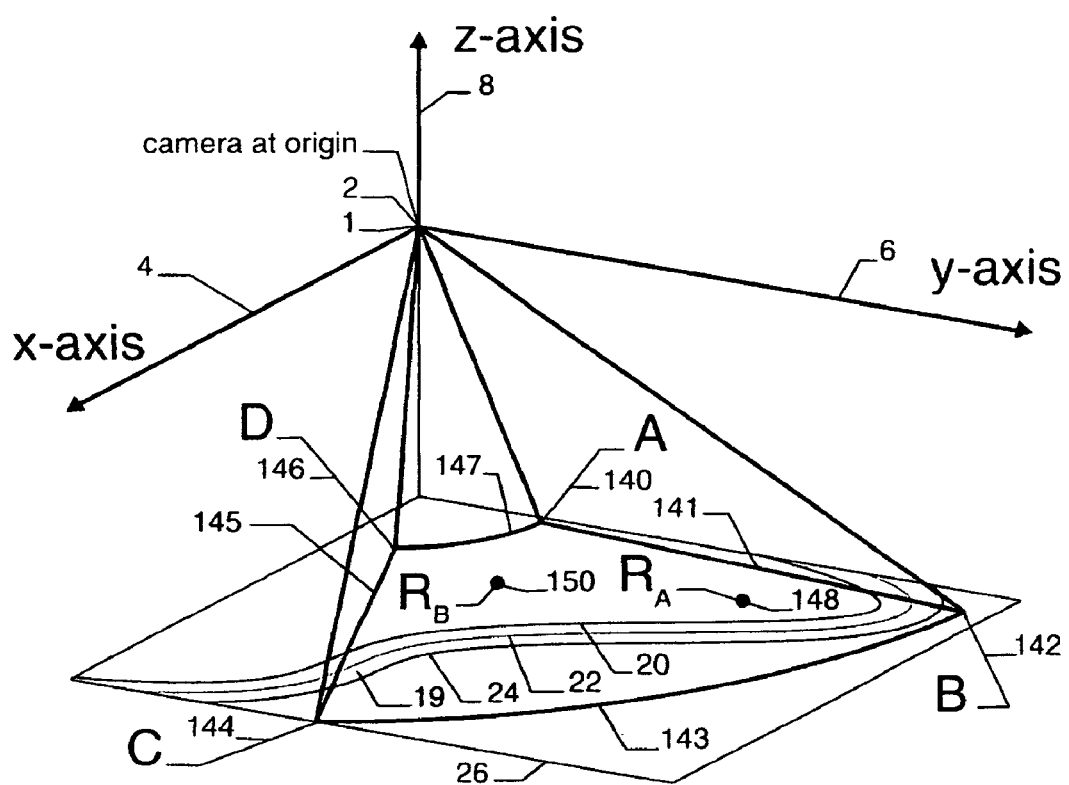
FIG. 5 is a diagram illustrating a field of view of the optical observing system in the three-dimensional real world.

While the three-dimensional real world space may be defined mathematically with Cartesian and Spherical coordinate systems, the optical observing system is limited to generating two-dimensional images representing the three-dimensional real world. The optical observing system uses a camera 2 with a defined field of view (FOV). FIG. 5 shows the FOV that is observed by one particular camera configuration. Camera 2 is located at origin 1 of the coordinate system. The amount of ground 26 area covered by the FOV is dependent on the properties of the optical system and the topography of the scene. The corners of the FOV are identified in FIG. 5 by labels A 140, B 142, C 144, and D 146. Point A 140 corresponds to the FOV with the tilt and pan angles of $(\phi_A, \theta_A)$. Points B 142, C 144, and D 146 correspond to the FOV with the tilt and pan angles of $(\phi_B, \theta_B)$, $(\phi_C, \theta_C)$, and $(\phi_D, \theta_D)$, respectively. The line segments between the corners of the FOV appear as curved lines in FIG. 5 and define the boundaries of the FOV. Between corners A 140 and B 142 is AB boundary 141. Between corners B 142 and C 144 is BC boundary 143. Between corners C 144 and D 146 is CD boundary 145. And between corners D 146 and A 140 is DA boundary 147. Two reference points are located on ground 26 in FIG. 5 and are labeled $R_A$ 148 and $R_B$ 150.

Figure 6:
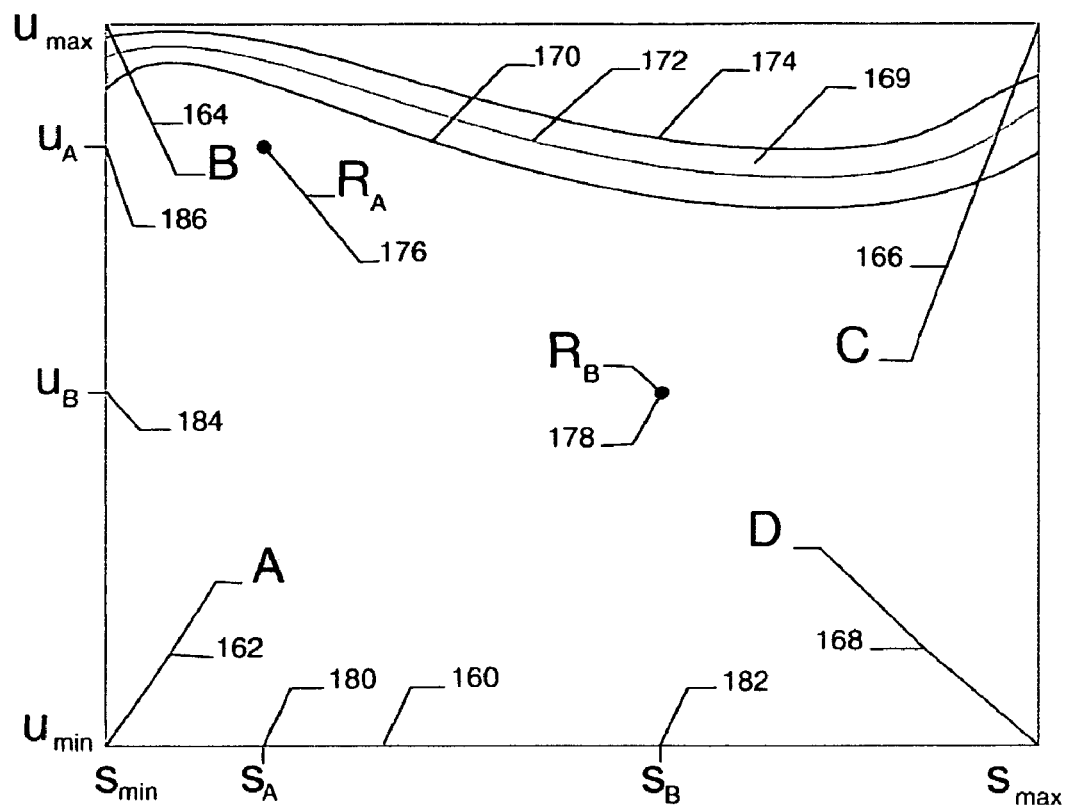
FIG. 6 is a diagram illustrating a field of view of the optical observing system in the two-dimensional optical image.

FIG. 6 is a two-dimensional image 160 representing the FOV as observed by the optical observing system. The FOV has two dimensions defined by the s- and u-axes. The points A 140, B 142, C 144, and D 146 defined in FIG. 5 as locations in the three-dimensional real-world appear at the corners in the two-dimensional image produced by the optical system shown in FIG. 6. In the (s, u) coordinate dimension, the points A 162, B 164, C 164, and D 166 are located at A(s=0, u=0), B(s=0, u=$u_{max}$), C(s=$s_{max}$, u=$u_{max}$), and D(s=$s_{max}$,u=0). The FOV recorded by the optical observing system is composed of pixels with the resolution of the optical system dependent on the number of pixels in each of the s and u dimensions. The optical system records individual frames of the FOV at pre-determined time intervals.

B.2. Defining the Coordinate Transformation

A coordinate transformation maps each (s,u) pixel observed by the optical system into a unique tilt and pan angle $(\phi,\theta)$ of the three-dimensional real world Spherical coordinate dimension. One method to construct this transformation is to use pre-determined locations in the real-world space as calibration points for the image space. These selected calibration points act as anchor points in the transformation. One concern in the transformation is the non-linearity and the distortions in the optical observing system. Nonlinearities and distortions in the optical image result from imperfect optics in the lens of camera 2. If the optical observing system is linear and distortionless, then only two calibration points are needed to construct the coordinate transformation. The larger the non-linearity and distortion in the optical observing system, the more calibration points will be needed. If the non-linearity and distortions of the optical observing system may be quantified using mathematical relationships, then the calibration may be performed using only a few reference points and the mathematical relationships defining the imperfections in the optical observing system. The amount of non-linearity and distortion in the optical images will be dependent on the imperfections of the optical observing system and does not detract from the novelty or performance of the present invention. For the ease of describing the coordinate transformation, the following discussion assumes that the optical observing system is an ideal system that is distortionless and linear over the FOV.

FIG. 5 illustrates the location of two reference marks labeled $R_A$ 148 and $R_B$ 150. The reference marks are non-moving and are visible within the FOV. The physical locations of the reference marks have been pre-determined and their tilt and pan angles are stored in a database. One easy method to determine the location of the reference marks is to use differential Global Positioning System (GPS) measuring techniques to measure the position of the reference marks relative to the position of camera 2. After the locations of the reference marks have been determined, the tilt and swing angles for each reference mark may be calculated using the geometry relationships expressed in equation (1).

FIG. 6 illustrates reference marks $R_A$ 176 and $R_B$ 178 as observed in the two-dimensional image obtained by the optical observing system. In the (s, u) coordinate dimensions, the reference mark $R_A$ 176 has the coordinates $s_A$ 180 and $u_A$ 186 and the reference mark $R_B$ 178 has the coordinates $s_B$ 180 and $u_B$ 186. Since the tilt and pan angles of the reference marks have been pre-determined, the tilt and pan angles for these two pixels are defined as:

$$\phi(s_A, u_A) = \phi_A \; \theta(s_A, u_A) = \theta_A \; \phi(s_B, u_B) = \phi_B \; \theta(s_B, u_B) = \theta_B \quad (18)$$

where $\phi_A$ and $\theta_A$ are the tilt and pan angles associated with the reference mark $R_A$ 148, and $\phi_B$ and $\theta_B$ are the tilt and pan angles associated with the reference mark $R_B$ 150.

The coordinate transformation between the three-dimensional real world and the two-dimensional image assigns a real-world tilt and pan angle to every pixel in the image. The reference marks are used to define the scaling between the three- and two-dimensional representations. In the three-dimensional real-world, difference between the pre-determined tilt and pan angles for reference marks $R_A$ 148 and $R_B$ 150 shown in FIG. 5 are given by:

$$\Delta\phi_{REF} = \phi_B - \phi_A \; \Delta\theta_{REF} = \theta_B - \theta_A. \quad (19)$$

In the two-dimensional image domain, the difference in the (s, u) coordinate dimensions between the reference marks $R_A$ 176 and $R_B$ 178 are estimated from the image shown in FIG. 6 and are expressed by:

$$\Delta s_{REF} = s_B - s_A \; \Delta u_{REF} = u_B - u_A. \quad (20)$$

Assuming a linear and distortionless optical observing system, the tilt and pan angles for each pixel in the image shown FIG. 6 are estimated using:

$$\phi(u) = \phi_A + (u - u_A) \frac{\Delta \phi_{REF}}{\Delta u_{REF}} \quad (21)$$

and:

$$\theta(s) = \theta_A + (s - s_A) \frac{\Delta \theta_{REF}}{\Delta s_{REF}}. \quad (22)$$

Equation (21) defines the pixel tilt angle which is the tilt angle associated with each pixel. And equation (22) defines the pixel pan angle which is the pan angle associated with each pixel. Note that in equation (21) the pixel tilt angle is only a function of the u dimension and that in equation (22) the pixel pan angle is only a function of the s dimension. This stems from the assumed distortionless and linearity of the theoretical ideal optical observing system. After including the distortion and non-linearity that is particular to each specific optical observing system, the coordinate transformations expressed in equations (21) and (22) will also be dependent on both the s and u dimensions. In addition, as the distortion and non-linearity of the optical observing system increase across the FOV, more reference points with pre-determined three-dimensional locations will be needed.

B.3. The Prior Art Optical Velocity versus Three-Dimensional Velocity Vector

In the Prior Art associated with the technical field of image processing, it is common to identify moving objects in an optical image constructed from a two-dimensional matrix of pixels. The same object is identified in a sequence of images and the distance the object moves across the two-dimensional matrix of pixels is estimated for each selected pair of images. The distance the object moves across the image is called the optical distance and the optical velocity of the object is calculated from the optical distance divided by the time between the selected pair of images. The optical distance and optical velocity of the object are relevant to only the two-dimensional matrix of pixels that compose the optical images. The optical distance and optical velocity have no relevance to the three-dimensional real world.

As described in the last section, three-dimensional real-world tilt and pan angles are assigned to each pixel of the two-dimensional image created by the optical observing system. With the addition of assigning the elevation of the road for every pixel tilt and pixel pan angle, each pixel in the two-dimensional image represents a location in the three-dimensional real-world as described mathematically using equations (6) or (7). In the present invention, the location in the three-dimensional real world of the identified vehicle is used to estimate the distance the vehicle has traveled in the three-dimensional real world during the time interval between the pair of images as described mathematically in equation (8). Also in the present invention, the velocity vector of the vehicle is estimated in the three-dimensional real world by dividing the three-dimensional real world distance traveled by the time interval between the pair of images as described mathematically in equation (9). Thirdly, in the present invention, the three-dimensional real world vehicle speed is estimated in the three-dimensional real world from the three-dimensional real world vehicle velocity as shown in equation (10). Lastly, in the present invention, the three-dimensional real world vehicle direction is estimated in the three-dimensional real world from the three-dimensional real-world vehicle velocity as shown in equation (11).

B.4. Recalibrating the Coordinate Transformation After Changing the Field of View In previous sections, it has been described how the coordinate transformation between the three-dimensional real-world and the two-dimensional image is the process of assigning a three-dimensional real-world tilt and pan angle to every pixel in the two-dimensional matrix of pixels that compose the two-dimensional image. Of coarse, the pixel in the center of two-dimensional image corresponds to the tilt and pan angle of camera 2. All of the other pixels in the two-dimensional image have unique tilt and swing angles dependent on the zoom characteristics and the other properties, including distortion and non-linear optical properties, of the optical observing system.

The coordinate transformation between the three-dimensional real world and the two-dimensional image is dependent on the field of view (FOV) of the optical observing system. Every time the tilt angle, pan angle, or zoom characteristics of camera 2 change, then the FOV of camera 2 changes and the coordinate transformation between the three-dimensional real world and the two-dimensional image must be recalculated.

In some optical observing systems, the tilt angle, pan angle, and zoom characteristics of camera 2 may be changed by an operator. If the optical observing system provides information on camera 2 tilt angle, camera 2 pan angle, and zoom characteristics, then the coordinate transformation between the three-dimensional real world and the two-dimensional optical image may be performed using mathematical relationships. The coordinate transformation may be recalculated whenever camera 2 camera tilt angle, camera pan angle, or zoom characteristics change.

If the optical observing system does not provide information on the tilt angle, pan angle, and zoom characteristics of camera 2, then the coordinate transformation between the three-dimensional real-world and the two-dimensional optical image may be performed using reference marks in the FOV, where their location in the three-dimensional real-world has been pre-determined. By identifying the reference marks in the two-dimensional optical image, the coordinate transformation between the three-dimensional real world and the two-dimensional optical image may be performed as described mathematically in equations (19) through (22).

B.5. Reference Marks Useful for the Coordinate Transformation

Reference marks $R_A$ 148 and $R_B$ 150 illustrated in FIG. 5 are used to calibrate the coordinate transformation between the three-dimensional real world and the two-dimensional optical image. Reference marks should have unique features, which will allow an automatic image processing search routine or an operator to search the optical images for the reference marks. A reference mark is considered pre-determined when the physical location of the reference mark is known and available to help calibrate the coordinate transformation. Reference marks may be installed in the FOV for the intended purpose of acting as calibration aids. Reference marks may be objects or features already in the FOV. For example, symbols painted on the road, including turn arrows, merge arrows, and traffic flow aids, may be reference marks. Buildings and road signs may also be used as reference marks. The purpose of the reference mark is to pre-determine the location of several points within the FOV for calibration of the coordinate transformation between the three-dimensional real world and the two-dimensional optical image.

An automatic image processing search routine may be used to search the optical image to locate the reference marks. Objects that have two dimensions, for example, buildings or traffic signs, may be used as reference marks useful for an automatic image-processing search. The automatic image processing search routine searches the two-dimensional image looking for patterns that scale and match the shapes and relative locations of multiple reference marks stored in a database. After the reference marks are identified, the pre-determined locations of these reference marks in the three-dimensional real world are used to calibrate the coordinate transformation between the three-dimensional real world and the two-dimensional optical image.

C. Identifying Moving Vehicles in the Optical Images

This section describes how moving vehicles are identified in the two-dimensional optical images.

C.1. Identifying Moving Vehicles in the Sequence of Images

In the Prior Art associated with the technical field of image processing, it is common to identify moving objects in the sequence of optical images with each optical image constructed from a two-dimensional matrix of pixels. There are many image processing techniques described in the Prior Art, and it is not the intent of the present invention to present a new and novel image processing technique. The present invention describes the identification of moving vehicles in the sequence of images using common image processing techniques.

Figure 7:
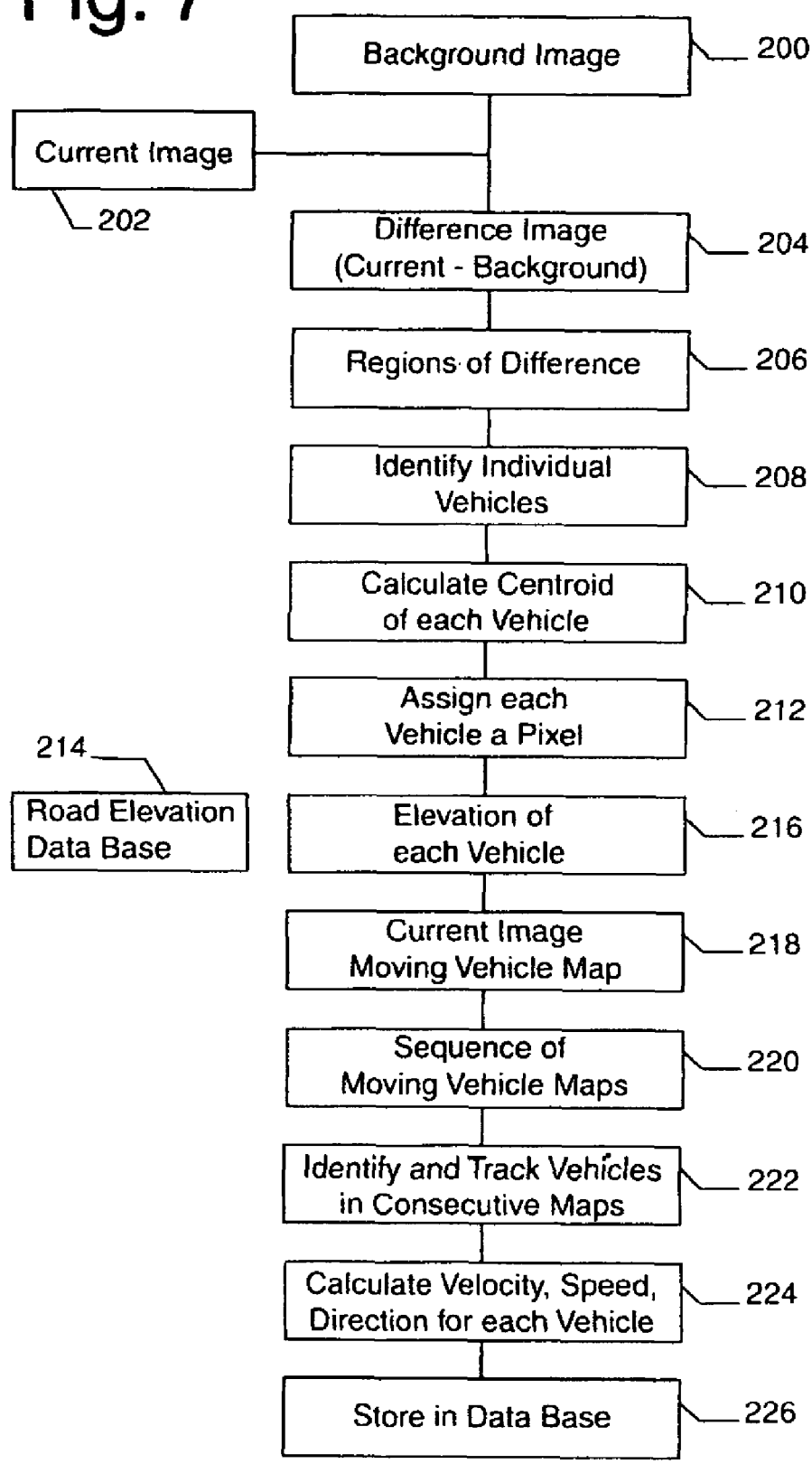
FIG. 7 is a flowchart illustrating steps to identify the vehicle in the optical images and to estimate the vehicle velocity vector, speed, and direction.

The process used to identify vehicles in the sequence of optical images is shown in FIG. 7. The background image is generated by constructing a long-term average of the collected optical images in step 200. The difference between the long-term average background image generated in step 200 and a current image from step 202 produces a difference image in step 204. Differences between background image from step 200 and the current image from step 202 occur in regions that contain moving vehicles and these regions are identified in the difference image in step 204 as regions of difference in step 206. These regions of difference from step 206 may be processed to separate single vehicles from multiple vehicles that are closely spaced to identify individual vehicles in step 208. The location of each individual vehicle in the two-dimensional image is determined by calculating the centroid of the pixels associated with each vehicle in step 210. From the calculated centroid of each vehicle, a pixel in the two-dimensional image is assigned to each vehicle in step 212.

A database is constructed containing the pre-determined three-dimensional real world road elevation data assigned to each pixel tilt angle and pixel pan angle of camera 2 to form road elevation data base 214. The elevation of each vehicle in step 216 relative to camera 2 is determined from road elevation database 214 and the pixel tilt angle and pixel pan angle assigned to each vehicle from step 212. The three-dimensional real world location of each vehicle is added to the current image moving vehicle map in step 218. The current image moving vehicle map of step 218 is added to a sequence of moving vehicle maps in step 220. The sequence of moving vehicle maps in step 220 contains a sequence of three-dimensional real-world locations of the moving vehicles for each time there is an image in the sequence of optical images. From the sequence of moving vehicle maps of step 220, the individual vehicles are identified and tracked in consecutive maps in step 222. The velocity, speed, and direction of each vehicle are calculated in step 224 and stored in a database in step 226 for future analysis. The process described in FIG. 7 may be performed in real-time with the sequence of images containing only images collected before the current image. The process described in FIG. 7 may also be performed after the sequence of images has been collected and the current image is one of the images in the sequence of stored images in an optical image database.

D. System Integration—Modes of Operation

While the previous sections described and how the velocity may be estimated using an optical system, this section describes the operation of the system from the initial camera set-up to displaying the estimates on the optical images.

D.1. Set-up of Camera

The optical images analyzed to determine vehicle movement are generated from an optical observing system that comprises a camera and the associated electronics to generate optical images. The optical observing system is mounted above a roadway system and pointed downward to observe the individual roads. Camera 2 may be mounted on a dedicated pole or structure. Likewise, camera 2 may be mounted on a bridge crossing or on a building or other structure near the roads being observed. Camera 2 may also be mounted on a portable structure useful for temporary deployments. How camera 2 is mounted or to what camera 2 is attached is not critical, but camera 2 must be above the roads and pointed downward to observe the vehicles on the road. Since camera 2 is defined to be at the center of the Cartesian and Spherical coordinate systems, knowing the location of camera 2 relative to the roads being observed is important.

D.2. Survey of Roads

After the location of camera 2 has been determined, all of the roads need to be surveyed relative to the location of camera 2. The simplest case is when all of the roads are at the same elevation relative to camera 2 elevation. This single elevation is entered into the elevation database.

If roads in the potential field of view are at different elevations or have elevations that change with distance, then the three-dimensional real-world tilt angle, pan angle, and elevation of every road relative to the location of camera 2 need to be entered into the elevation data base. After the roads are surveyed, the elevation database will contain the elevation of the roads as a function of tilt and pan angles.

Note that if vehicles travel in areas that are not on a 'road', then the topography of the surfaces the vehicles travel need to be included in the elevation data base. The present invention is valid whether or not the vehicle is on a road or off-road as long as the three-dimensional real world tilt angle, pan angle, and elevation information of the surface is in the elevation database.

D.3. Identification of Reference Marks

Reference marks are used to calibrate the coordinate transformation between the optical two-dimensional optical image and three-dimensional real world. Reference marks need to be identified and their physical locations relative to camera 2 should be measured. One easy method to determine the location of the reference marks is to use differential GPS measurement techniques to measure the position of the reference marks relative to position of camera 2. These physical locations may need to be converted to tilt angle, pan angle, and elevation using the geometric relationships expressed in equation (1). The tilt angle, pan angle, and elevation for each reference mark are entered into the reference mark database.

D.4. Data Collection and Processing

Figure 8:
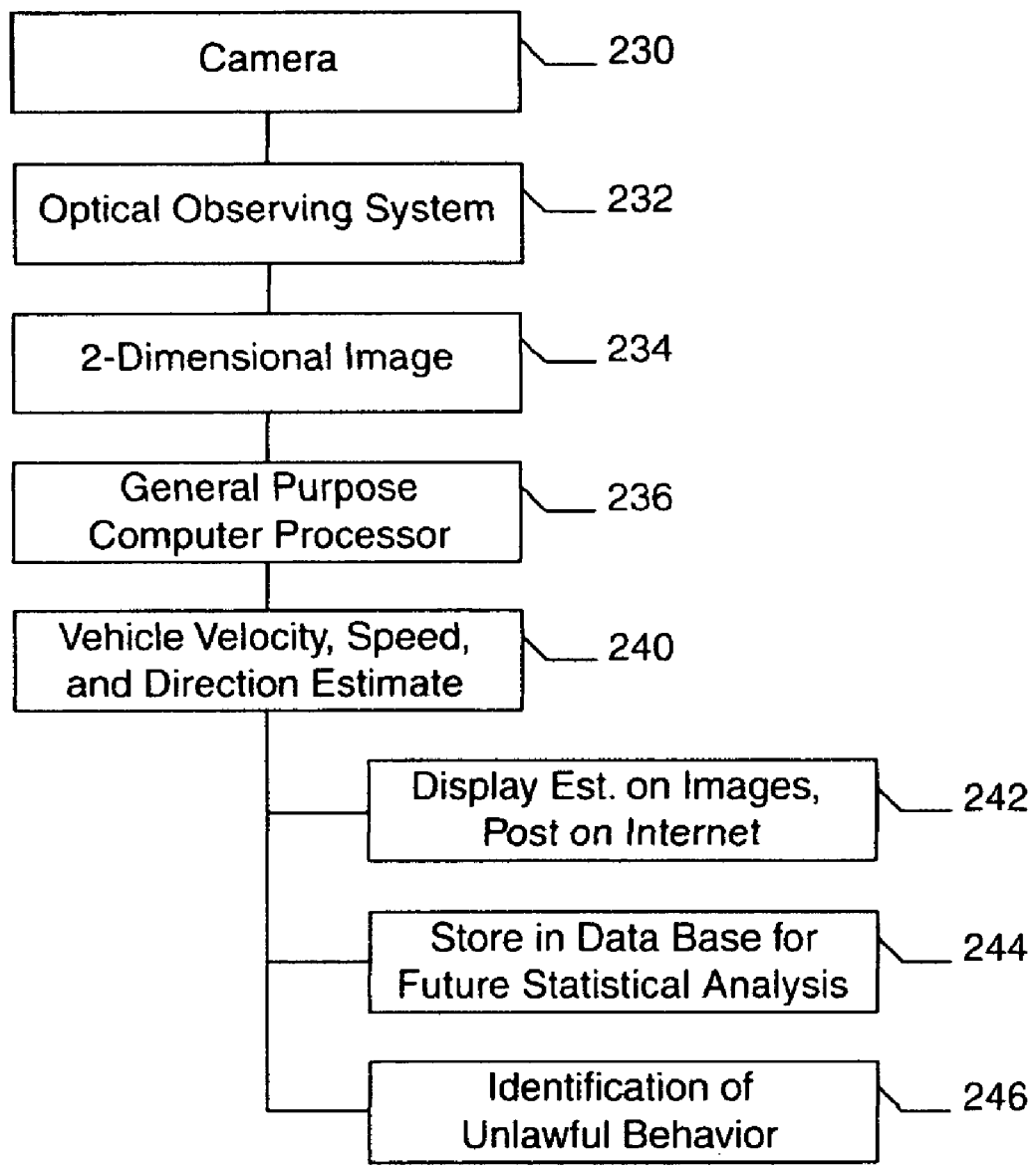
FIG. 8 is a flowchart illustrating steps to collect the data and to process the optical images.

The data collection and processing sequence is shown schematically in FIG. 8. The camera 230 collects input for the optical observing system 232. The optical observing system generates a two-dimensional optical image 234 that is passed to a central processing unit 236. The central processing unit may comprise a computer programmed to perform the image processing functions described in FIG. 7. As described in FIG. 7, the central processing unit analyzes each optical image to identify each moving vehicle. The sequence of processed optical images is analyzed to quantify the movement of each vehicle. One of the outputs of the process described in FIG. 7 is the velocity vector, speed, and direction estimates for each vehicle in the FOV 240.

The velocity vector, speed, and direction estimates for each vehicle may be incorporated into three new and novel applications. First, the vehicle estimates may be super-imposed on a optical image and displayed 242. The display may be useful for traffic monitoring professionals, for television news broadcasting, or for the general public. The display may comprise a sequence of images with the added vehicle estimates forming a streaming video or the display may comprise a single image with the added vehicle estimates to form a static image that may be posted in an Internet. The second application stores the vehicle estimates in database 244 which may be available for future statistical analysis. These analyses include traffic flow monitoring that count the number of vehicles, estimate the vehicle speed, and document unlawful behavior on the roadways. These analyses will not be able to identify the particular individual vehicles performing the unlawful behavior. The third application uses the vehicle estimates in conjunction with either other technologies or a human to identify unlawful behavior in step 246 and perform a corrective action or impose a punitive action.

Figure 9:
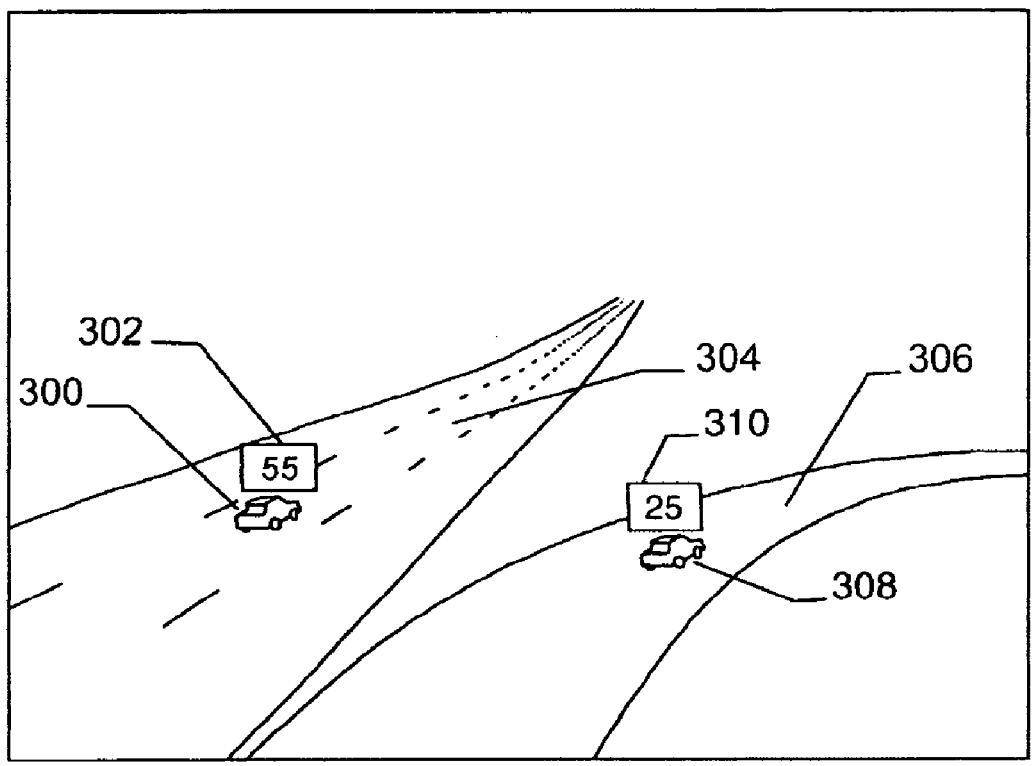
FIG. 9 illustrates one frame observed by an optical observing system of a multi-lane freeway with an exit ramp that decreases in elevation with distance away from the camera.

D.5. Another Preferred Embodiment—Display of Vehicle Velocity on the Optical Image The estimated velocity vector, speed, and direction of the multiple vehicles in the optical system field of view may be displayed on an optical image in at least two different formats. The first format displays the velocity estimate on top of the associated vehicle in the optical image. The calculated estimate moves across the image as the vehicle moves across the image. Either an instantaneous estimate or a time-average estimate may be displayed on the image. FIG. 9 illustrates an optical image of a roadway system with the estimated vehicle speeds shown superimposed on top of the two vehicles 300, 308 displayed in the optical image, traveling on two different roads. Estimated speed 302 is shown superimposed on top of vehicle 300 traveling on road 304, and estimated speed 310 is shown superimposed on top of vehicle 308 traveling on road 306.

In FIG. 9, two vehicles 300, 308 are shown traveling on two different roads 304, 306. Vehicle 300 is traveling on multi-lane road 304 away from camera 2, while vehicle 308 is traveling on exit ramp 306 away from camera 2. The elevation of exit ramp 306 is changing and has a curved path. Estimating vehicle velocity in the three-dimensional real world enables vehicle velocity to be estimated on the exit ramp 306 even as the road elevation changes and the road has a curved path.

Figure 10:
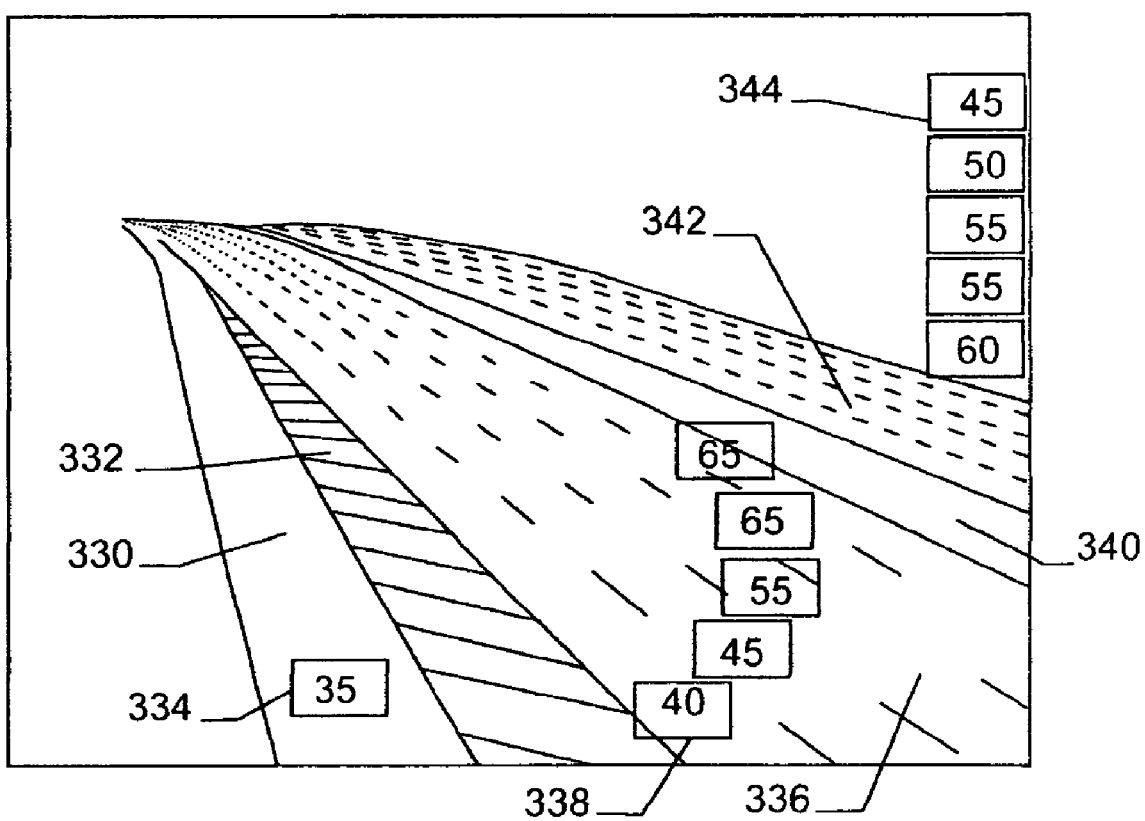
FIG. 10 illustrates one scene observed by an optical observing system of a multi-lane freeway with an exit ramp that increases in elevation with approaching distance to the camera.

Another display option super-imposes the velocity estimate on the optical image in a fixed position over the road as the vehicles pass under the superimposed estimates. The numbers displayed may be the instantaneous values or the time-average values of the vehicles traveling in that lane of the road. FIG. 10 is an image of a roadway illustrating estimated vehicle velocities 338 associated with each lane of a multi-lane roadway 336 displayed over each lane of roadway 336. FIG. 10 also shows the velocity estimate 344 placed on the optical image not directly over the lane, but in an orderly fashion in a region of the display that does not contain important information.

FIG. 10 is an image of multi-lane roadway 336 with a single lane road 330, a multi-lane road with traffic 336 traveling toward camera 2, and a multi-lane road with traffic 342 flowing away from camera 2. The three roadways are separated with physical barriers 332 and 340. The fixed position speed display 334 for single lane road 330 may be placed near the bottom of the image and superimposed over road 330. The multi-lane road with traffic 336 traveling toward camera 2 has four lanes and the fixed position speed displays 338 are superimposed over each lane of road 336. There is not enough room on the image to superimpose the fixed position speed display directly over the appropriate lane in this example. Therefore, fixed position speed displays 344 may be positioned in a logical order on the image. For clarity, the multiple vehicles traveling in the multi-lane road are not shown in FIG. 10.

I claim:

1. A system for determining velocity in three dimensions of at least one vehicle, from a two-dimensional image of the at least one vehicle in a roadway, comprising:

a camera configured to acquire two-dimensional images of a three-dimensional roadway system, the roadway system comprising at least one road, the roadway system including at least one vehicle moving relative to a background scene, a processor, coupled to the camera, configured to receive and store an image sequence of the three-dimensional roadway system, said processor configured to record the image sequence as a series of frames, each frame including image data forming a two-dimensional representation including a plurality of image regions depicting the moving vehicles and the background scene at an associated point in time, the processor configured to map each pixel of the two-dimensional background image to a three-dimensional model of the three-dimensional roadway system to produce a conversion map for converting two dimensional pixel locations to three-dimensional real-world locations, the processor configured to convert pixels assigned in the two-dimensional image to each identified vehicle to a three-dimensional real world location using the conversion map, the processor configured to identify a moving vehicle of the plurality of moving vehicles by comparing a plurality of frames of the image sequence and identifying a image region of the image sequence including the moving vehicle, the processor configured to calculate a location of the moving vehicle in the three-dimensional roadway system in each of the plurality of frames containing the image region including the moving vehicle, and the processor configured to calculate a velocity vector consisting of a speed and a direction of the moving vehicle in the three-dimensional roadway system in each of the plurality of frames containing the image region including the moving vehicle.

2. The system of claim 1, wherein the processor is configured to generate a background image by constructing a long-term average of collected optical images, and is configured to identify regions of the background image predetermined to contain moving vehicles, the processor is configured to measure a difference between the long-term average background image and a current image to produce a difference image, the processor is configured to process the predetermined regions in the difference image to produce regions of difference, and the processor is configured to process the regions of difference to separate single vehicles from multiple vehicles identify individual vehicles;

wherein the processor is configured to determine a location of an individual vehicle in each frame of the two-dimensional image by calculating the centroid of the pixels associated with each vehicle and assigning a pixel in each frame of the two-dimensional image to each identified vehicle.

3. The system of claim 2, wherein the processor is configured to measure a difference between determined three-dimensional real world locations of a vehicle for different frames of the two-dimensional image to determine a distance traveled by the vehicle in the three-dimensional real world between frames, and the processor is configured to divide the difference by a time between frames to determine velocity of the vehicle.

4. The system of claim 1, wherein the processor is configured to map each pixel of the two-dimensional background image to a three-dimensional model of the three-dimensional roadway system to produce a conversion map, the processor is configured to accept a survey of at least a portion of the at least one road in the three-dimensional roadway system, the processor configured to produce a three-dimensional data map of the roadway system comprising a plurality of road location data points; the processor configured to accept a survey of a plurality of three-dimensional reference points within a field of view of the camera; and the processor configured to correlate the plurality of three-dimensional reference points within the field of view of the camera to two-dimensional pixels in the background image to convert the plurality of road location data points to pixels in the background image.

5. The system of claim 4, wherein the processor is configured to map each pixel of the two-dimensional background image to a three-dimensional model by being configured to locate the reference points in the video image after the camera is moved; and being configured to re-correlate the plurality of three-dimensional reference points within the field of view of the camera to two-dimensional pixels in the background image to convert the plurality of road location data points to pixels in the background image.

6. The system of claim 1, further comprising:
an image processor, coupled to the processor, the image processor configured to display velocity of the at least one vehicle on each of the plurality of frames near the image region including the at least one vehicle.

7. The system of claim 1, further comprising:
an image processor, coupled to the processor, the image processor configured to display velocity of the at least one vehicle on each of the plurality of frames in a fixed location in the frame.

8. The system of claim 1, further comprising:
an image processor coupled to the processor, the image processor configured to display velocity of the at least one vehicle on a frame and a communications means for displaying said frame on an Internet.

9. The system of claim 4, wherein
the processor is configured to measure camera tilt and pan angle after camera movement to calculate a difference in camera tilt and pan angle from a previous camera position; and
the processor is configured to update the plurality of road location data points converted to pixels in the background image by applying the difference in camera tilt and pan angle to mathematically calculate new values for corresponding pixels in the background image.

* * * * *